United States Patent [19]

Cicci et al.

[11] Patent Number: 4,546,599
[45] Date of Patent: Oct. 15, 1985

[54] ROLL OPENER FOR A MOWER CONDITIONER

[75] Inventors: George B. Cicci, Burr Ridge; Erik J. Guldberg, Downers Grove, both of Ill.

[73] Assignee: The Paul Revere Corporation, Coldwater, Ohio

[21] Appl. No.: 668,003

[22] Filed: Nov. 5, 1984

[51] Int. Cl.[4] ............................................. A01D 82/00
[52] U.S. Cl. .................................. 56/16.4; 56/DIG. 1
[58] Field of Search ...................... 56/11.9, 1, DIG. 1, 56/16.4, 192, 208

[56] References Cited

U.S. PATENT DOCUMENTS

| 3,397,520 | 8/1968 | Johnston et al. | 56/DIG. 1 |
| 4,175,366 | 11/1979 | Cicci | 56/DIG. 1 |
| 4,473,993 | 10/1984 | Jennings et al. | 56/192 |

FOREIGN PATENT DOCUMENTS 138778 10/1960 U.S.S.R. ............ 56/DIG. 1

Primary Examiner—Gene Mancene
Assistant Examiner—John G. Weiss
Attorney, Agent, or Firm—Abraham Ogman; Robert J. McNair

[57] ABSTRACT

Roll opening apparatus for separating the crop conditioning rolls of a mower conditioner is presented. The mower conditioner is of the type wherein a wheel supported main frame has mounted thereto by pivotal linkage a transversely disposed header having a sickle spanning its forward edge, a rotary reel for rearwardly sweeping the crop cuttings across a platform, and an auger at the rear of the platform for delivering the crop cuttings to the nip of a pair of laterally extending upper and lower crop conditioning rolls. The lower conditioning roll is rotatably mounted to the header on a fixed axis. The upper conditioning roll is mounted on lever arms pivoted to the header and biased by tension springs to an operating position adjacent the lower roll. Each lever arm is fitted with a hydraulic cylinder mounted so that extension of its piston causes the upper conditioning roll to open against the force of the tension springs. The two roll lift cylinders are plumbed in parallel with a pair of hydraulic cylinders which raise the header to its transport position. All four hydraulic cylinders work from the same source of pressurized fluid. The component parameters are chosen such that on application of gradually increasing fluid pressure, the header will be fully raised to its transport position before roll separation commences.

4 Claims, 7 Drawing Figures

ROLL OPENER FOR A MOWER CONDITIONER

BACKGROUND OF THE INVENTION

This invention relates to apparatus for opening the conditioning rolls of a mower conditioner when the header is raised to the transport position. The mower conditioner in which the crop conditioning rolls and the roll opening apparatus is incorporated is of the type having a wheel mounted frame to which is attached a laterally disposed header. The front edge of the header includes a sickle for cutting the crop material as well as means for delivering the harvested material to the nip of the conditioning rolls.

Prior art mower conditioners for use in harvesting hay are disclosed in: Cicci et al, U.S. Pat. No. 4,174,600; Johnson et al, U.S. Pat. No. 3,397,520; and Hurlburt et al, U.S. Pat. No. 3,599,405. In the Hurlbert et al machine there is a wheel supported frame, a header having crop-treating elements thereon pivotally mounted on the frame, link means operatively connecting the header to the frame, and lift means on the frame for pivoting the frame about a horizontal axis. In the machine of Johnson et al, the conditioning rolls are automatically raised by a linkage whenever the header is raised to the transport position. The hay harvesting machine of Cicci et al includes a header which is vertically movable relative to the carrying frame. There is a conditioning roll opening device consisting of a linkage which not only separates the rolls but also serves to stabilize the header when it is in the transport position.

The present invention differs from the prior art in that the rolls are opened by a pair of hydraulic cylinders. The conditioning rolls are separated during the last part of the header lift cycle to allow the machine operator to unplug the mower conditioner without having to leave the tractor seat.

SUMMARY OF THE INVENTION

This invention pertains to apparatus that forms a part of a hay harvesting machine of the type wherein a header is vertically movable relative to a wheel supported carrying frame. The main carrying frame includes a laterally extending horizontal beam on each end of which there is a vertically disposed strut-like member supported by a wheel rotatably mounted on a spindle. The center of the horizontal beam has pivotally attached thereto a forwardly extending tongue which connects to the rear end of a tractor. The crop harvesting header, spanning a width of 12 ft. or more, mounts to the frame by pivotal linkage which includes upper and lower links with the lower links being adjacent the wheel spindles. These linkages permit movement of the header between operating and transport positions.

A haycutting sickle spans the forward edge of the header. A conventional rotary reel is rotatably mounted above the sickle and serves to sweep crop cuttings rearward from the sickle across a platform to an auger. The flights of the auger and the positioning of the auger itself are arranged to deliver crop cuttings to the nip of a pair of laterally extending upper and lower conditioning rolls. The lower conditioning roll is rotatably mounted on a fixed axis while the upper roll is rotatably mounted at each end on lever arms pivotally attached to the header. The lever arms are biased by springs to make the upper roll operate closely adjacent the lower roll. The roll opening structure utilizes a pair of hydraulic cylinders. The base end of each cylinder is pivotally mounted to the header. The piston rod end of the first cylinder is pivotally attached to the lever arm on the left end of the upper conditioning roll. Similarly, the piston rod end of the second cylinder is pivotally attached to the lever arm on the right end of the upper conditioning roll. Hydraulic fluid is supplied to both cylinders in parallel causing the pistons thereof to extend simultaneously and thereby raise the upper conditioning roll against the force of the tensioning springs.

The header itself is raised and lowered by means of a pair of hydraulic lift cylinders, one in each vertically disposed strut. Each lift cylinder functions in combination with the upper and lower linkage arms that tie the header to the frame. The two lift cylinders and the two roll opening cylinders are plumbed so that hydraulic fluid is supplied to all four in parallel. The header lift cylinders are sized so that a fluid pressure between 850-1200 psi will raise the header to the transport condition. The conditioning rolls, on the other hand, are preloaded by two springs, one on each lever arm, so that almost 1500 psi of fluid pressure must be applied before the rolls begin to separate. For full separation 2000 psi of pressure is required.

In operation, the header is raised until the header lift cylinders are fully extended, then the roll opening hydraulic cylinders begin to separate the rolls by raising the upper roll. On lowering the machine the spring load on the roll causes the roll opening cylinders to collapse while the weight of the header causes the header lift cylinders to collapse. The roll closing is almost instantaneous with opening of the valve spool of the hydraulic fluid pressure source. The header requires 3 to 4 seconds to lower.

DETAILED DESCRIPTION OF THE PREFERRED EMBODIMENT

Figure 1:
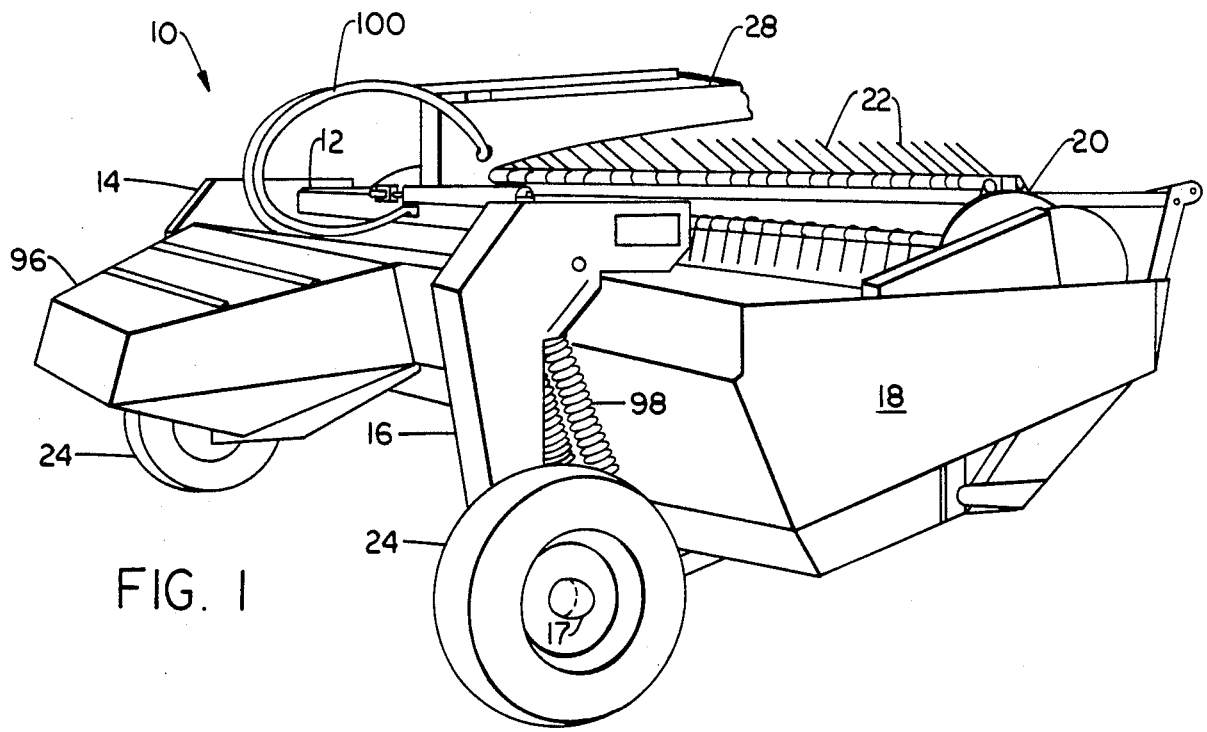
FIG. 1 is an isometric view of the right side of a mower conditioner containing the invention.
Figure 2:
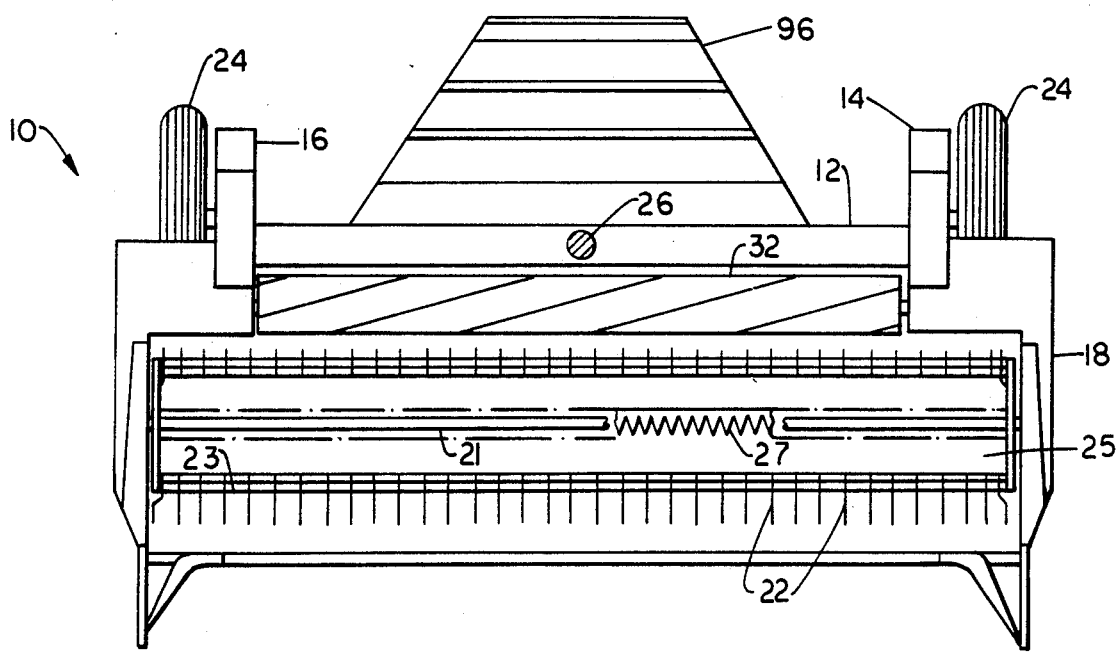
FIG. 2 is a plan view of the mower conditioner shown in FIG. 1.

There is shown in FIGS. 1 and 2 a mower conditioner 10 which includes a mobile carrying frame comprising a horizontal main beam 12, left and right vertical frame members 14 and 16 having ground wheels 24 rotatably mounted on spindles 17. The vertical frame members 14 and 16 are of inverted L-shape and are hollow to receive a portion of the lifting and floatation mechanism for the crop harvesting header assembly 18. A short post 26 extending upward from the center of main beam 12 provides a pivotal attachment point for a forwardly extending tongue 28, thereby allowing connection to a tractor.

Figure 3:
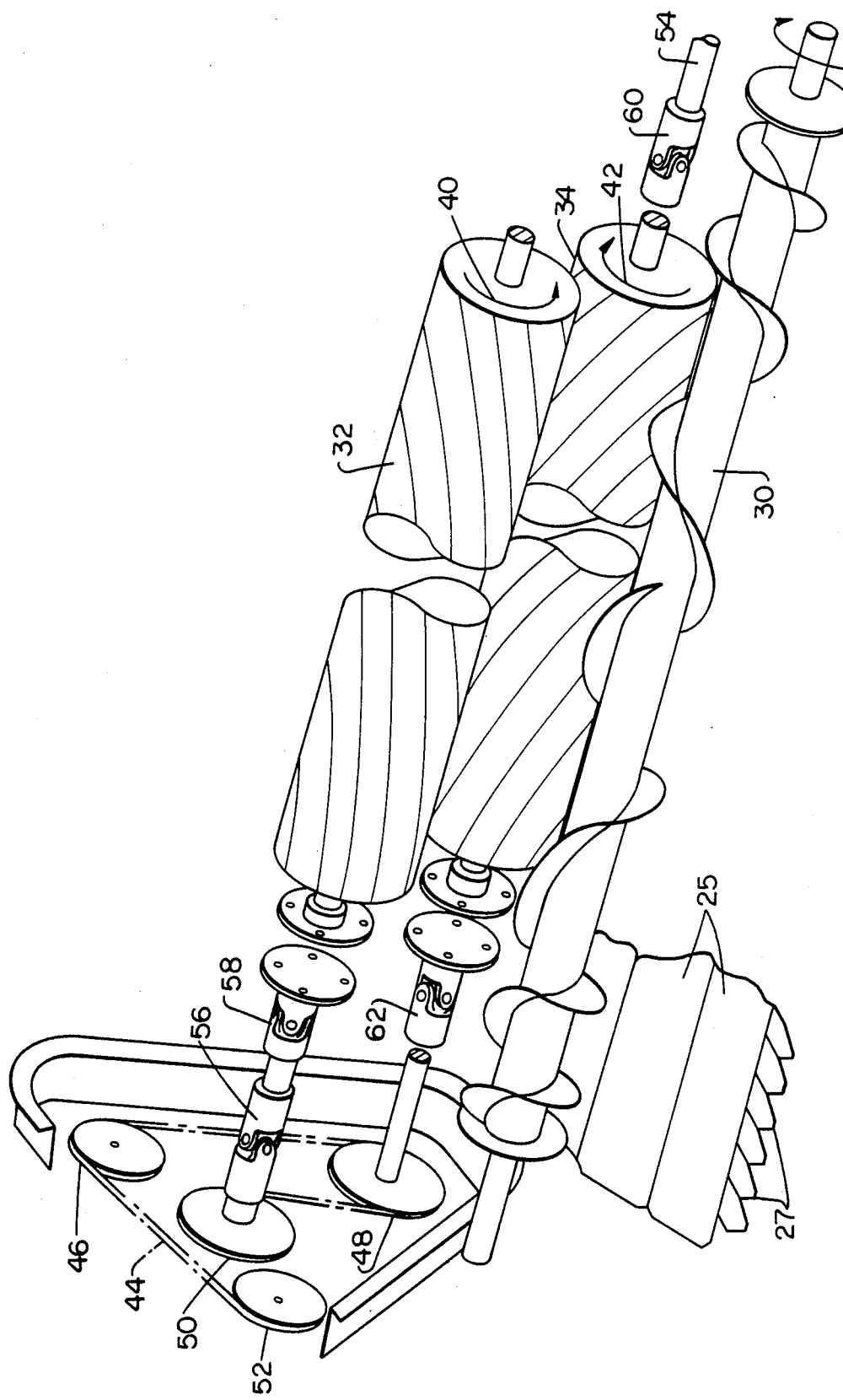
FIG. 3 is an isometric view, partially exploded, showing the relative position and drive system arrangement for the conditioning rolls.

Header assembly 18 comprises a laterally elongated platform 25 extending twelve or more feet between side sheets. A conventional rotary reel 20 is mounted above the platform and between the side sheets. Reel 20 includes a core tube 21 and a multiplicity of tines 22 arranged to extend outwardly from several reel tine bars 23. Cutter bar 27 extends across the front edge of the header. Reel 20 sweeps crop cuttings rearwardly from cutter bar 27 across platform 25. As depicted in FIG. 3 but not shown in FIG. 2, there is an auger 30 along the entire rear edge of platform 25. The flights of auger 30 are counter wound as shown and operate to centrally bunch crop cuttings swept therein by the rotational action of reel 20. As a result auger 30 delivers crop cuttings into the nip of a pair of upper and lower crop conditioning rolls 32 and 34 respectively.

Figure 4:
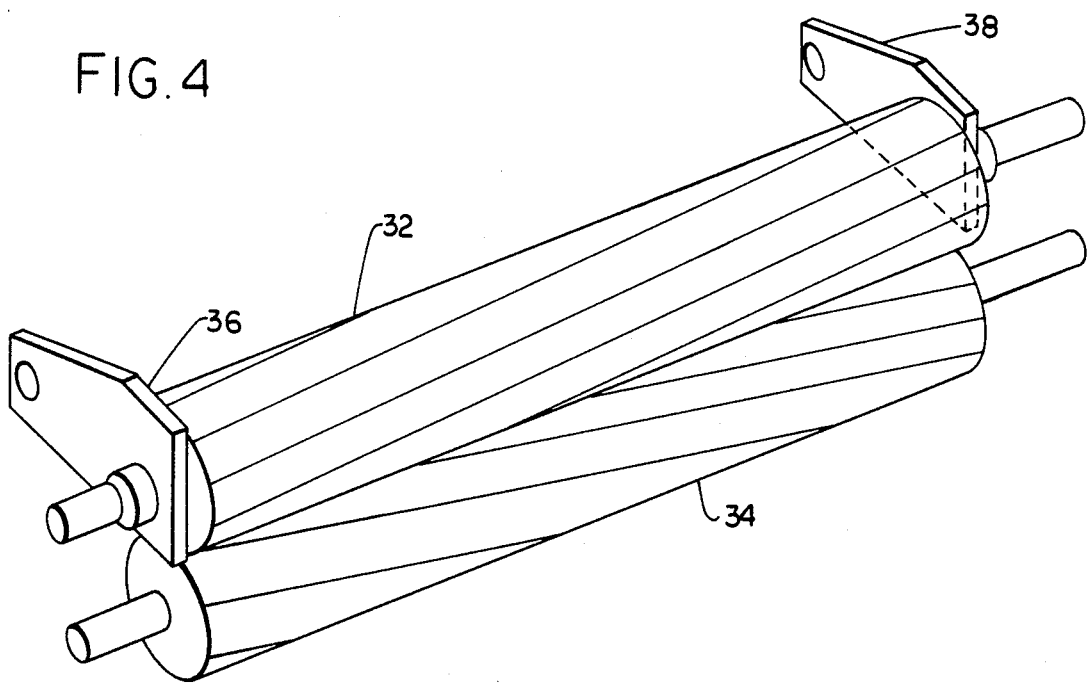
FIG. 4 shows the lever arm mounting arrangement for the upper conditioning roll.

Conditioning rolls 32 and 34 do not extend the full width of the platform (See FIG. 3). Use of auger 30 makes it possible to use shorter conditioning rolls and the flexible mounting arrangement depicted in FIGS. 3 and 4. Upper conditioning roll 32 is mounted on lever arms 36 and 38. These two lever arms are pivotally mounted to the subframe of header 18. Lower conditioning roll 34 is fixedly mounted for rotation on the subframe of the header. Both upper and lower conditioning rolls have serrated edges (See FIG. 5). The rolls are oriented one to the other so that the two rolls mesh with the upper roll turning counterclockwise (see arrows 40 and 42). To allow for coordinated operation of the conditioning rolls, the sprocket and chain drive arrangement shown in FIG. 3 was incorporated. Chain 44 passes over idler sprocket 46, around lower conditioning roll sprocket 48, in a reverse direction around upper conditioning roll sprocket 50 and thence around sprocket 52. The pair of conditioning rolls may then be driven either by means of shaft 54 or by means of a motor (not shown) attached to sprocket 52. The use of a pair of universal joints 56 and 58 allows the upper conditioning roll to move up and down by means of lever arms 36 and 38. In the unit reduced to practice, a tensioning force of approximately 700 lbs. was applied between rolls. For this reason, it was found to be operationally prudent to include universal joints 60 and 62 immediately adjacent the ends of lower conditioning roll 34 to accommodate flexing at the bearing supports.

Figure 5:
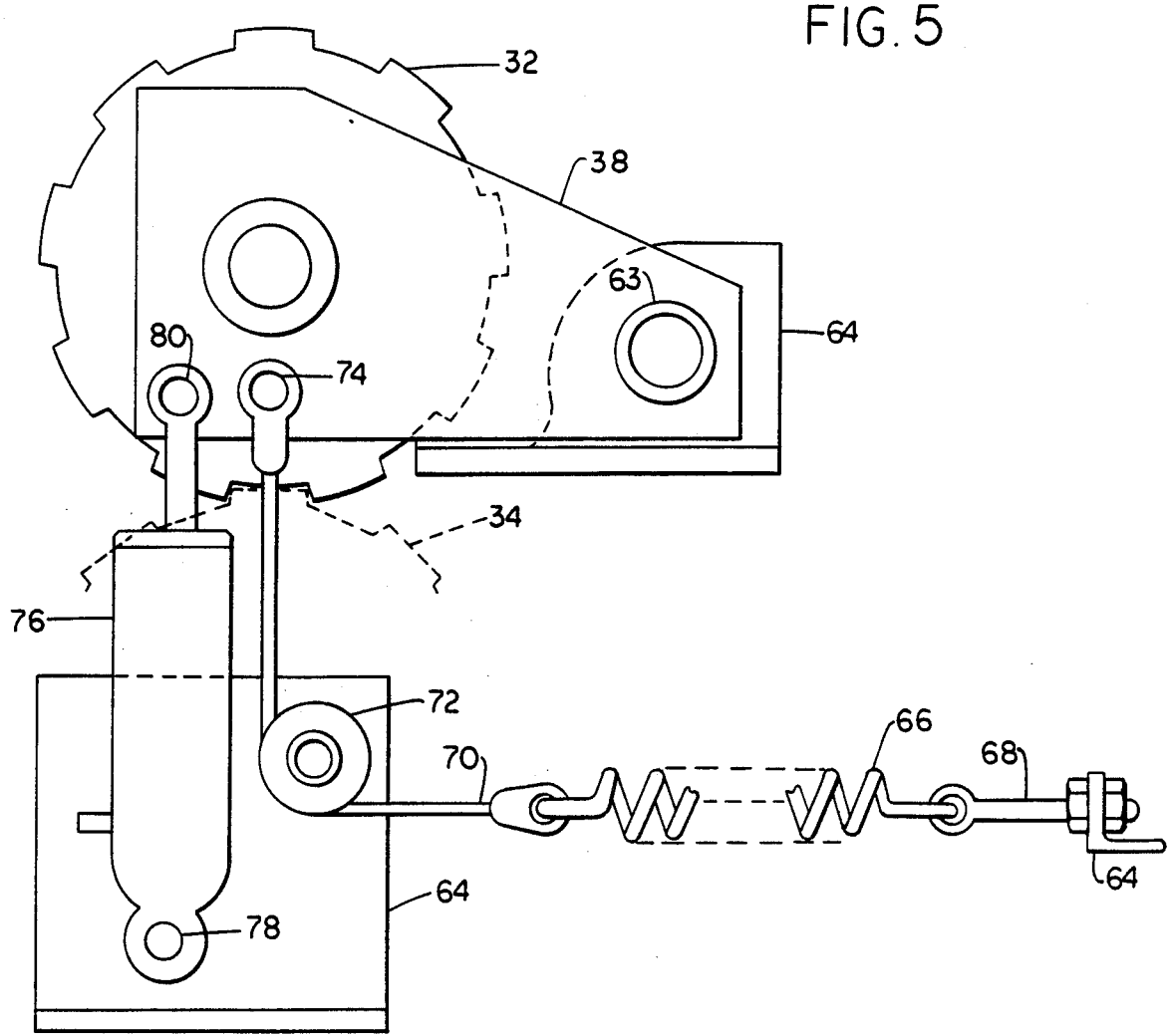
FIG. 5 is an end view of the left end upper roll lever arm showing the placement of the hydraulic lifting cylinder and roll tensioning spring.

As shown in more detail in FIG. 5, the left end of upper conditioning roll 32 is rotatably mounted to lever arm 38. The pivotal end of lever arm 38 is rotatably mounted to header subframe 64 by means of stub shaft 63. Tension to hold the upper roll 32 against the lower conditioning roll is provided by spring 66. Spring 66 is anchored to header subframe 64 by means of eyebolt 68. The other end of tension spring 66 has attached thereto a cable 70 which passes over a direction reversing pulley 72 to an attachment point 74 on the lower edge of lever arm 38. Tension in spring 66 and its companion on the right hand end of upper conditioning roll 32 serves to hold the upper roll against the lower roll 34 which is shown in phantom in FIG. 5. When it is desired to separate the upper and lower conditioning rolls 32 and 34, hydraulic fluid is applied to cylinder 76. The base end of cylinder 76 is attached by bolt means 78 to header subframe 64. The piston end of cylinder 76 is rotatably attached by pin 80 to the lower edge of lever arm 38. Application of hydraulic fluid pressure will thus force the upper roll to separate from contact with the lower conditioning roll 34 provided that the fluid pressure in the cylinder is sufficient to overcome the force applied by tensioning spring 66.

Figure 7:
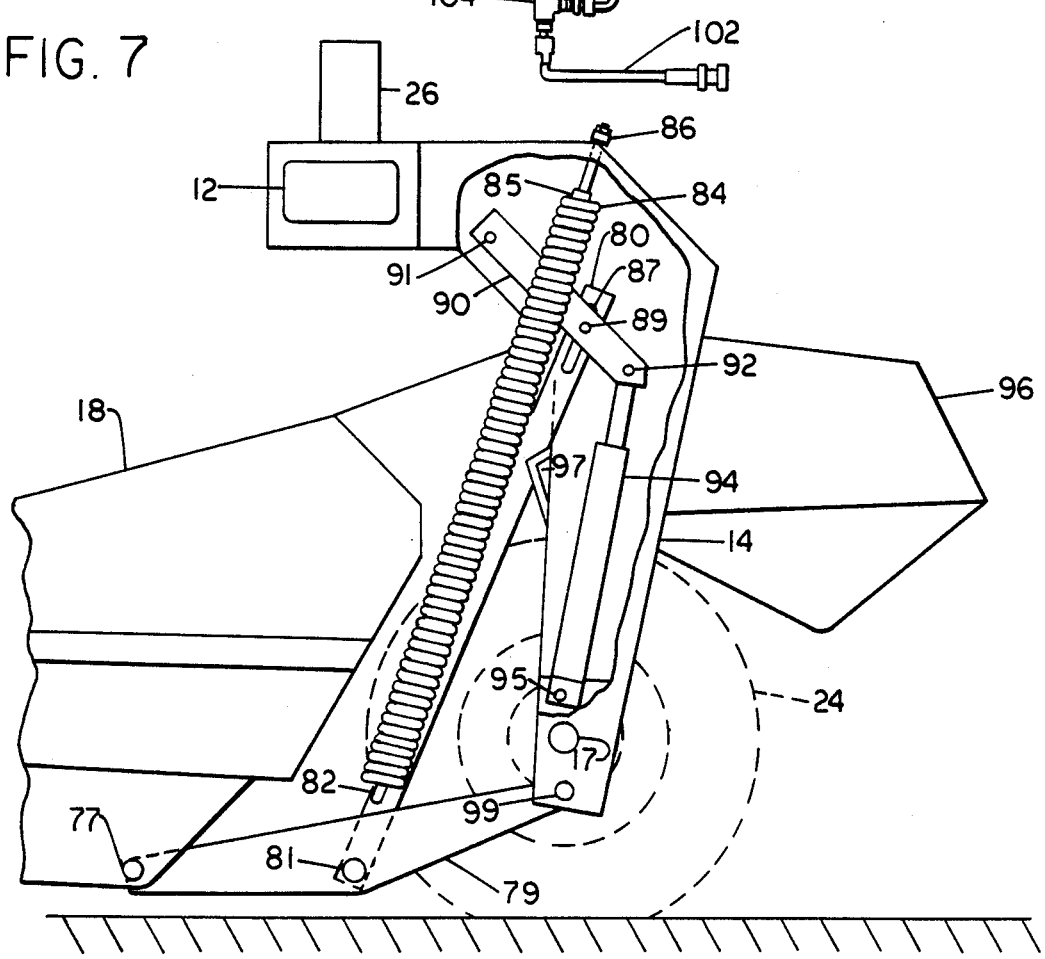
FIG. 7 is a cutaway left side view of the mower conditioner showing the placement of one of the header lift cylinders.

FIG. 7 shows the lifting and floatation means provided for raising and lowering the header 18 relative to the carrying frame and for counterbalancing a large portion of the weight of the header 18 to allow it to follow the ground in a more responsive fashion. To this end, a lifting strap 80 is pivotally connected as by pin 81 to the lower link 79 midway between its ends which are pivotally hinged at the forward end by pin 77 to header 18 and at the rear end to the bottom of vertical frame member 14 by pin 99. At the bottom of link 79 below pivot pin 99, strap 80 extends upwardly to a spring anchor 82 attached thereto as by welding and extending laterally outwardly on either side thereof. The lower ends of a pair of floatation tension springs 84 are hooked on the respective spring anchors 82 and extend upwardly inside the frame member 14 to end retaining collars 85 which are threaded on adjusting screws 86 extending through the vertical frame members 14. Thus, by turning screws 86, a proper amount of tension may be placed on the floatation springs 84. The lifting strap 80 extends beyond the floatation spring anchors 82 to a slotted upper end inside the vertical frame member 14. Lifting strap 80 slides vertically in slot 97 which is secured to frame member 14. The slot 87 in the upper end of the lifting strap 80 is engaged by a pin 89 on a lifting lever 90 pivotally connected to the frame member 14 as by transverse pin 91. The lifting lever 90 extends radially outward from pin 91 passed lifting strap 80 to a pivotal connection at pin 92 with the rod end of a hydraulic cylinder 94 pivotally anchored as at 95 to a gusset within the vertical frame member 14.

It will be understood that a similar lift and float mechanism is attached to the right swing link and extends into the right vertical frame member 16. Thus, when the header 18 is in operating position, the floatation springs 84 and 98 (See FIG. 1) acting on the lower swing links through the short portion of the lifting strap 80 counterbalance the header 18 while the lost motion connections between the slot 87 and the lifting lever 90 prevents the hydraulic cylinders 94 from being pumped during floatation in normal operation. It will be seen that since the connection 81 of the lifting strap is at the bottom of the link 79 and below the pivot 99, the lever arm through which the floatation springs 84 and 98 (See FIG. 1) act, increases as the header 18 floats upwardly. Thus, although the springs 84 become weaker, the increased lever arm prevents the counterbalancing effect from being reduced accordingly. Extending the hydraulic cylinder 94 and its companion on the right side takes up the lost motion at slot 87 and acting on the lower swing links through the lifting strap 80, raises the header to the transport or uppermost position.

Figure 6:
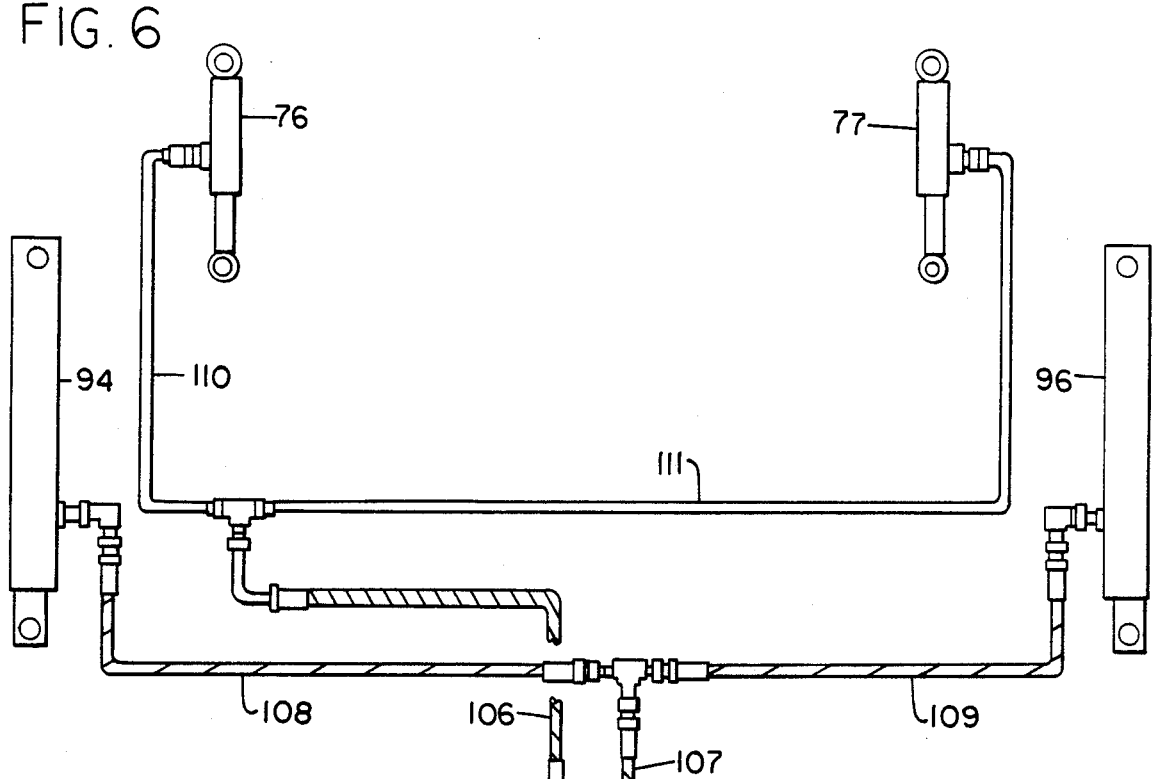
FIG. 6 shows a schematic of the hydraulic system with the header lifting cylinders being connected in parallel with the roll opening cylinders.

FIG. 6 shows the hydraulic lines which deliver operating fluid to both the roll opening cylinders 76 and 77 and the header lift cylinders 94 and 96. In the system reduced to practice, pressurized hydraulic fluid was supplied by the tractor used to tow the mower conditioner. This fluid was delivered via hydraulic lines installed onto tongue 28 (See FIG. 1). Flexible hose 100 spanned the region between the pivotal tongue 28 and the main frame 12 of the mower-conditioner. Similar flexible high pressure hose (not shown) spanned the distance from the main frame to the header.

In FIG. 6, hydraulic line 102 is positioned on the header subframe and connects with the hydraulic hose bringing fluid from the mower conditioner tongue to the main frame. Bulkhead branch tee 104 divides the output of line 102 into two parts. One flows along high pressure hose 106 to the roll opening cylinders 76 and 77. The other part flows along high pressure hose 107 to header lift cylinders 94 and 96. Since the header moves with respect to the positioning of the lift cylinders 94 and 96, due to their location in the vertical frame members (See FIG. 7) it is necessary to use flexible high pressure lines 108 and 109 to make connection with the header lift cylinders. Lines 110 and 111 can be plumbed using rigid tubing since the bases of roll opening cylinders 76 and 77 remain fixed with respect to the header subframe.

With both the roll opening and header lift cylinders plumbed as shown in FIG. 6, oil pressure applied at line 102 will simultaneously act on all four cylinders. In the system reduced to practice the cylinders were sized and biased so that the header raising and roll opening actions were sequential. The header lift cylinders 94 and 96 were sized so that working in conjunction with springs 84 and 98 (See FIGS. 7 and 1) application of hydraulic pressure in an amount between 850 and 1200 psi fully raises the header to the transport position.

The upper conditioning roll (See FIG. 5) is held against the lower roll both by its own weight and the force exerted by the two tension springs, one (spring 66) pulling down on the left lever arm 38, the other pulling down on right lever arm 36. As a result, in the system reduced to practice, approximately 700 lbs of force was required to bring about initial separation of the upper and lower conditioning rolls. Spring 66 and its mate on the other end of the upper conditioning roll are sized so that the spring force increases by approximately 300 lbs for each inch of roll separation. This means that a force of about 1300 lbs is required to raise the upper roll 32 (See FIG. 4) to achieve a two inch spacing between rolls. The roll opening cylinders are sized so that about 1500 psi of hydraulic pressure is needed to initiate separation. For full separation 2000 psi of hydraulic pressure is required.

This means that in operation, the header rises to the transport position with the header lift cylinders fully extended before the conditioning rolls begin to separate. Thus, if the tractor operator sees a plug forming at the nip of the conditioning rolls, he activates the hydraulic valve to apply pressure to the lift cylinders. The header rises, stopping the cutting of additional crop material, then the conditioning rolls begin to separate allowing passage of the slug of wadded up crop material rearward between the rolls and out the back of the machine.

Once the slug of crop material is passed, the operator releases hydraulic pressure by opening the valve spool at the tractor. With hydraulic pressure released at hydraulic line 102 (See FIG. 6) the upper conditioning roll 32 (See FIG. 5) quickly closes onto roll 34 due to the force applied by tension spring 66 and its companion at the right hand end of the roll. The header 18 (See FIGS. 1 and 7) drops more slowly when hydraulic line pressure is removed since the header weight is partially counterbalanced by springs 84 and 98. In the unit reduced to practice, lowering the header took between three and four seconds.

In summary, a header for a mower conditioner is disclosed wherein a sickle bar crop cutting apparatus is disposed laterally across the front lower edge. A conventional rotary reel, rotatably mounted above the cutting apparatus, serves to sweep crop cuttings rearward across a platform and into a transversely mounted rotating auger. The flights of the auger are counter wound, one end with respect to the other, so that crop cuttings are moved transversely inward toward a central region. Immediately behind and above the auger is a pair of crop conditioning rolls mounted one above the other. The rolls are transversely mounted but only about 70 percent as long as the auger. The lower conditioning roll is rotatably mounted on a fixed axis and the upper roll is mounted at each end to lever arms which are pivotally mounted to the header to allow swinging movement of the upper roll toward and away from the upper roll. Spring tension is maintained at each of the two lever arms to press the upper roll against the lower. The drive for the rolls is timed so that the spirals which are cut into the surface of each roll makes them run centered within its mated companion.

In combination, the rotating auger and reel deliver crop material to the nip of upper and lower conditioning rolls. The crop material passes between the conditioning rolls with the stems being bent and split open at short intervals. The conditioned crop material is ejected rearwardly and upwardly by conditioning rolls 32 and 34 (See FIG. 3) in the form of a stream which strikes windrow forming hood 96 (See FIGS. 1 and 7). Within windrow forming hood 96, the crop material is further consolidated and then deposited in a neat windrow on the ground behind the machine.

Thus, there has been disclosed roll opening apparatus which operates sequentially with the header lifting mechanism. While the invention has been described in conjunction with a specific embodiment, it is evident that many modifications will be apparent to those skilled in the art. Accordingly, it is intended to embrace such alternatives within the scope of this invention.

For example, not all mower conditioners have augers. In practice it has been found that headers which are less than 12 feet wide do not require the use of an auger. Without an auger, the reel will convey the crop cuttings directly from the cutter bar into the nip of the rollers.

For some implementations the crop cutting apparatus will comprise something other than a sickle bar. At least two other cutting means are known in the art. U.S. Pat. No. 4,085,570 to Joray et al and assigned to the same assignee as this application discloses a flail type forage harvester. As described at column 4, lines 40 et seq of U.S. Pat. No. 4,085,570 a flail type cutting apparatus includes a rotatable rotor carrying a plurality of flails or knives. The knives are secured to the rotor in four rows defined by a plurality of four rods spaced 90 degrees apart. Each rod extends through openings in a set of knives mounted serially at spaced intervals thereon. Each knife in each row overlaps the knives of alternate rows by a small amount to produce an even and complete cutting action when the rotor assembly is turned. With the flail type cutting apparatus a reel assembly is not needed as the flails will convey crop cuttings directly to the rear of the header.

Another crop cutting apparatus which does not utilize a sickle bar is the rotating disk subassembly. In this implementation a multiplicity of rotatable disks span the lower front edge of the header. Each disk is between 1 and 2 feet in diameter and mounted so as to be rotatably driven in a generally horizontal plane. The disks are driven so as to rotate in synchronism. One or more small knife blades are attached to the periphery of each disk serving to sever crop stems as the header advances.

With this type cutting apparatus a reel assembly is usually not required since the rotating disks convey crop cuttings rearward as the material falls onto the top surface of the multiplicity of spinning disks.

Finally, our invention will accomplish the roll opening task for implementations wherein the conditioning rolls are mounted in the main frame structure and not in the movable header structure. In this implementation, the lower conditioning roll is fixedly mounted for rotation on the main frame while the upper conditioning roll is pivotally mounted to the main frame. The drive for the conditioning rolls and the roll opening action is the same as earlier disclosed for the preferred embodiment. The header will include only the crop cutting apparatus, the means for conveying crop material to the nip of the conditioning rolls and the header raising and lowering mechanism which enables both an operating and a transport mode.

We claim:

1. A crop harvesting and conditioning machine comprising:
    a wheel supported main carrying frame;
    a laterally extending crop harvesting header mounted to said main carrying frame by pivotal linkage including upper and lower swing links permitting movement of said header between a lower operating position and a raised transport position by means of a first hydraulic lifting means;
    crop cutting apparatus mounted on the forward lower portion of the header for severing the standing crop material;
    upper and lower transversely extending crop conditioning rolls rotatably mounted to said header rearwardly of said cutting apparatus, said lower conditioning roll being mounted on a fixed axis and said upper conditioning roll being mounted at each end to lever arms pivotally mounted to said header for relative swinging movement of the upper roll toward and away from said lower roll;
    a second hydraulic lifting means having first and second hydraulic roll lift cylinders for lifting the upper crop conditioning roll;
    crop catching and conveying means for delivering the crop cuttings laterally in a rearward direction away from said crop cutting apparatus and into the nip of said upper and lower conditioning rolls;
    a source of hydraulic fluid pressure for supplying hydraulic fluid in parallel to said first and second hydraulic lift means;
    spring tension means connected to each of said lever arms for biasing said upper roll to an operating position closely adjacent said lower roll;
    said spring tension means further for sequencing said first and second hydraulic means so that said second hydraulic lifting means requires more hydraulic fluid pressure to lift said upper conditioning roll than is required by the first hydraulic means to lift the header; and
    said first and second hydraulic roll lift cylinders pivotally mounted on said header adjacent the left and right ends of said upper conditioning roll, the centerline of said first roll lift cylinder being in the plane of rotation of the lever arm on the left end of said upper roll, the centerline of said second roll lift cylinder being in the plane of rotation of the lever arm on the right end of said upper roll, one end of each of said first and second roll lift cylinders being pivotally attached to said lever arms at locations for causing said upper conditioning roll to be opened against the force of said spring tension means when the pistons of said cylinders are extended due to application of hydraulic fluid pressure.

2. A crop harvesting and conditioning machine comprising:
    a wheel supported main carrying frame;
    a laterally extending crop harvesting header mounted to said main carrying frame by pivotal linkage including upper and lower swing links permitting movement of said header between a lower operating position and a raised transport position, said header including crop cutting apparatus mounted on the forward lower portion thereof for severing standing crop material by means of a first hydraulic lifting means;
    upper and lower transversely extending crop conditioning rolls rotatably mounted to said main frame rearwardly of said header, said lower conditioning roll being mounted on a fixed axis and said upper conditioning roll being mounted at each end to lever arms pivotally mounted to said main frame for relative swinging movement of the upper roll toward and away from said lower roll;
    a second hydraulic lifting means having first and second hydraulic roll lift cylinders for lifting the upper crop conditioning roll;
    a source of hydraulic fluid pressure for supplying hydraulic fluid in parallel to said first and second hydraulic lift means;
    crop catching and conveying means mounted on said header for delivering crop cuttings laterally in a rearward direction away from said crop cutting apparatus and into the nip of said upper and lower conditioning rolls;
    spring tension means connected to each of said lever arms for biasing said upper roll to an operating position closely adjacent said lower roll said spring tension means further for sequencing said first and second hydraulic means so that said second hydraulic lifting means requires more hydraulic fluid pressure to lift said upper conditioning roll than is required by the first hydraulic means to lift the header; and
    said first and second hydraulic roll lift cylinders pivotally mounted on said header adjacent the left and right ends of said upper conditioning roll, the centerline of said first roll lift cylinder being in the plane of rotation of the lever arm on the left end of sad upper roll, the centerline of said second roll lift cylinder being in the plane of rotation of the lever arm on the right end of said upper roll, one end of each of said first and second roll lift cylinders being pivotally attached to said lever arms at locations for causing said upper conditioning roll to be opened against the force of said spring tension means when the pistons of said cylinders are extended due to application of hydraulic fluid pressure.

3. A crop harvesting and conditioning machine comprising:
    a main carrying frame;
    a laterally extending crop harvesting header mounted to said main carrying frame by pivotal linkage including a lower operating position and a raised transport position;

upper and lower transversely extending crop conditioning rolls, said upper conditioning roll being mounted to be raised and lowered relative to said lower crop conditioning roll;

first hydraulic lifting means for lifting said header to a raised transport position;

second hydraulic lifting means for lifting said upper conditioning roll;

hydraulic pressure source for supplying hydraulic fluid pressure in parallel to said first and second hydraulic lifting means; and spring tension means for biasing said upper conditioning roll against said lower conditioning roll, said spring tension neans further for sequencing said hydraulic means so that said second hydraulic lifting means requires more hydraulic fluid pressure to lift said upper conditioning roll than is required by the first hydraulic means to lift the header, whereby said header is in the raised position before said upper conditioning roll lifts.

4. An invention as defined in claim 3 wherein said first hydraulic lifting means and said second hydraulic lifting means are plumbed for parallel pressurization by a single source of hydraulic pressure, said first hydraulic lifting means being sized to accomplish raising of the header at a lower pressure than is needed by the second hydraulic lifting means for opening the upper conditioning roll.

* * * * *